UNITED STATES PATENT OFFICE.

ERNEST M. GARDNER HEWETT, OF NEWTON, MASSACHUSETTS, ASSIGNOR, BY DIRECT AND MESNE ASSIGNMENTS, TO THE SAFETY ELECTRIC LIGHT COMPANY, OF MAINE.

BATTERY COMPOUND.

SPECIFICATION forming part of Letters Patent No. 435,421, dated September 2, 1890.

Application filed June 29, 1889. Renewed February 3, 1890. Serial No. 338,975. (No specimens.)

*To all whom it may concern:*

Be it known that I, ERNEST M. GARDNER HEWETT, a citizen of the United States, residing at Newton, in the county of Middlesex and State of Massachusetts, have invented a new and useful Battery Compound, of which the following is a specification.

My invention has for its object the production of a compound to be used as a constituent of the exciting-fluid in a galvanic battery, which by reason of its anhydrous quality can be easily stored and transported, and which when dissolved produces a battery-fluid of unusual power and endurance.

It is well known that the trioxide of chromium is a hygrometric substance, readily becoming deliquescent in damp weather. I find that the muriate of ammonia when mixed with the trioxide of chromium deprives the latter of its hygrometric quality, forming an anhydrous compound which can readily be packed and transported from place to place. This compound when dissolved in water with or without the addition of sulphuric or other acid does not polarize and may be used in a single-fluid battery without a porous cup. For most purposes, however, it is more effective when used in the outer cell of a double-fluid battery, with an inner porous cup containing dilute sulphuric acid.

I do not confine myself to any specific proportions of the two ingredients above named; but for most purposes I prefer to use three parts, by weight, of the trioxide of chromium to one part of muriate of ammonia. Such a compound, composed of three-quarters of a pound of trioxide of chromium and one-quarter of a pound of muriate of ammonia, dissolved in a gallon of water containing a little sulphuric acid, produces a battery-fluid which is extremely effective. For the production of an electric current for lighting purposes, however, a stronger solution is desirable, and for this purpose I have found the proportion of two pounds of trioxide of chromium and six ounces of muriate of ammonia to a gallon of acidulated water extremely effective.

While the above-described compound may be dissolved in pure water and used as a battery-fluid, the conductive power of the solution is greatly increased and the fluid rendered more effective by the addition of a small proportion of sulphuric or other acid, as above indicated. Muriatic, nitric, or other acid may be used for this purpose; but I prefer to use sulphuric acid in such proportions as when added to the water the dilute acid will be of the specific gravity of 11.50 at the temperature of 60° Fahrenheit.

While it will usually be found most convenient to mix the two ingredients above mentioned and to form the battery-fluid by dissolving the compound in the acidulated water, the fluid may be made by mixing the ingredients in any desired order without affecting the efficiency of the solution.

What I claim, and desire to secure by Letters Patent, is—

1. The improved battery compound composed of trioxide of chromium and muriate of ammonia, as set forth.

2. The improved battery-fluid composed of trioxide of chromium and muriate of ammonia dissolved in water, as set forth.

3. The improved battery-fluid composed of trioxide of chromium and muriate of ammonia dissolved in water and combined with sulphuric acid or its described equivalent, as above set forth.

In testimony whereof I have signed my name to this specification, in the presence of two subscribing witnesses, this 21st day of June, A. D. 1889.

ERNEST M. GARDNER HEWETT.

Witnesses:
C. F. BROWN,
A. D. HARRISON.